(12) United States Patent
Williams et al.

(10) Patent No.: US 8,882,196 B2
(45) Date of Patent: Nov. 11, 2014

(54) CHILD SAFETY SEAT

(75) Inventors: Bruce L. Williams, Narvon, PA (US);
Gregory S. Sellers, Christiana, PA (US);
Curtis M. Hartenstine, Birdsboro, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 489 days.

(21) Appl. No.: 13/181,627

(22) Filed: Jul. 13, 2011

(65) Prior Publication Data

US 2012/0013159 A1     Jan. 19, 2012

Related U.S. Application Data

(60) Provisional application No. 61/399,663, filed on Jul. 15, 2010, provisional application No. 61/461,410, filed on Jan. 18, 2011, provisional application No. 61/518,426, filed on May 5, 2011.

(51) Int. Cl.
*B60N 2/26* (2006.01)
*A47D 1/10* (2006.01)
*B60N 2/28* (2006.01)

(52) U.S. Cl.
CPC ............ *B60N 2/2821* (2013.01); *B60N 2/2845* (2013.01); *B60N 2/2875* (2013.01); *B60N 2/2863* (2013.01)
USPC ................. 297/256.16; 297/250.1; 297/183.6

(58) Field of Classification Search
USPC ................. 297/256.13, 256.16, 250.1, 183.1; 248/371; 280/47.38, 643, 650, 658, 30
See application file for complete search history.

(56) References Cited

U.S. PATENT DOCUMENTS

| | | | |
|---|---|---|---|
| 4,743,063 A | 5/1988 | Foster, Jr. | |
| 4,915,446 A | 4/1990 | Darling et al. | |
| 4,943,113 A | 7/1990 | Meeker | |
| 5,052,750 A | 10/1991 | Takahashi et al. | |
| 5,181,761 A | 1/1993 | Meeker | |
| 5,385,387 A | 1/1995 | Kain | |
| 5,494,331 A | 2/1996 | Onishi et al. | |
| 5,676,386 A * | 10/1997 | Huang | ............................ 280/30 |
| 5,772,279 A | 6/1998 | Johnson, Jr. | |
| 5,865,447 A * | 2/1999 | Huang | ............................ 280/30 |
| 5,890,762 A * | 4/1999 | Yoshida | ................... 297/256.13 |
| 6,017,088 A | 1/2000 | Stephens et al. | |
| 6,030,047 A | 2/2000 | Kain | |
| 6,070,890 A | 6/2000 | Haut et al. | |
| 6,367,875 B1 | 4/2002 | Bapst | |
| 6,428,100 B1 * | 8/2002 | Kain et al. | ............... 297/256.16 |
| 6,446,990 B1 * | 9/2002 | Nania et al. | .............. 280/47.371 |

(Continued)

FOREIGN PATENT DOCUMENTS

| CN | 200948756 Y | 9/1997 |
|---|---|---|
| CN | 201124778 Y | 10/2008 |

(Continued)

*Primary Examiner* — David R Dunn
*Assistant Examiner* — Richard Lowry
(74) *Attorney, Agent, or Firm* — David I. Roche; Baker & McKenzie LLP (57) ABSTRACT

A child seat can comprise a seat shell having two protruding rails extending at an underside of the seat shell, at least four latches disposed in two symmetric pairs adjacent to the two rails, wherein the latches are operable to lock the child seat with a base, and a release mechanism operable to drive the latches to unlock from the base.

19 Claims, 13 Drawing Sheets

(56) References Cited

U.S. PATENT DOCUMENTS

| | | |
|---|---|---|
| 6,715,828 B1 * | 4/2004 | Cheng .................... 297/183.3 |
| 6,863,286 B2 * | 3/2005 | Eros et al. ................ 280/47.38 |
| 6,863,345 B2 | 3/2005 | Kain |
| 7,163,265 B2 | 1/2007 | Adachi |
| 7,472,955 B2 * | 1/2009 | Crane et al. ............ 297/256.16 |
| 7,484,801 B2 | 2/2009 | Kassai et al. |
| 7,513,512 B2 | 4/2009 | Yoshie et al. |
| 7,819,472 B2 * | 10/2010 | Hutchinson et al. ..... 297/256.16 |
| 2004/0207241 A1 | 10/2004 | Sedlack |
| 2005/0264062 A1 | 12/2005 | Longenecker et al. |
| 2006/0273640 A1 | 12/2006 | Kassai et al. |
| 2008/0303321 A1 | 12/2008 | Powell |
| 2010/0007187 A1 | 1/2010 | Hutchinson et al. |

FOREIGN PATENT DOCUMENTS

| | | |
|---|---|---|
| CN | 201151354 Y | 11/2008 |
| DE | 4137575 C1 | 11/1991 |
| EP | 609889 A1 | 4/1994 |
| EP | 631903 B1 | 10/1996 |
| EP | 2272709 A2 | 12/2011 |
| GB | 2202433 A | 9/1998 |
| WO | 2004034854 A1 | 4/2004 |
| WO | 2005079239 A2 | 9/2005 |
| WO | 2008017193 A1 | 2/2008 |

* cited by examiner

CHILD SAFETY SEAT

CROSS-REFERENCE TO RELATED APPLICATION

This application claims priority of U.S. provisional application No. 61/399,663 filed on Jul. 15, 2010, U.S. provisional application No. 61/461,410 filed on Jan. 18, 2011, and U.S. provisional application No. 61/518,426 filed on May 5, 2011.

BACKGROUND OF THE INVENTION

1. Field of the Invention

The present invention relates to child seats suitable for use in combination with either a base and/or stroller structure.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle. The seatbelt of the vehicle can be used to secure the child safety seat, which is more adapted to provide protection for the young child.

The child safety seat can include a seat portion and a base connected underneath the seat portion. To facilitate the use of the seat portion, attachment structures may be provided to allow the seat portion to attach with and be removed from the base. In particular, it is desirable that the foregoing attachment structures can hold the seat portion with the base in a more secure manner, and at the same time is easy to operate when the seat portion is to be removed from the base.

Therefore, there is a need for a child safety seat that can be safe in use and address at least the foregoing issues.

SUMMARY

The present application describes a child safety seat that can provide safety in use, and is easy to operate for removing the seat from a support structure, such as a base or a stroller structure. In one embodiment, the child seat can comprise a seat shell having two protruding rails extending at an underside of the seat shell, at least four latches disposed in two symmetric pairs adjacent to the two rails, wherein the latches are operable to lock the child seat with a base, and a release mechanism operable to drive the latches to unlock from the base.

DETAILED DESCRIPTION OF THE EMBODIMENTS

Figure 1:
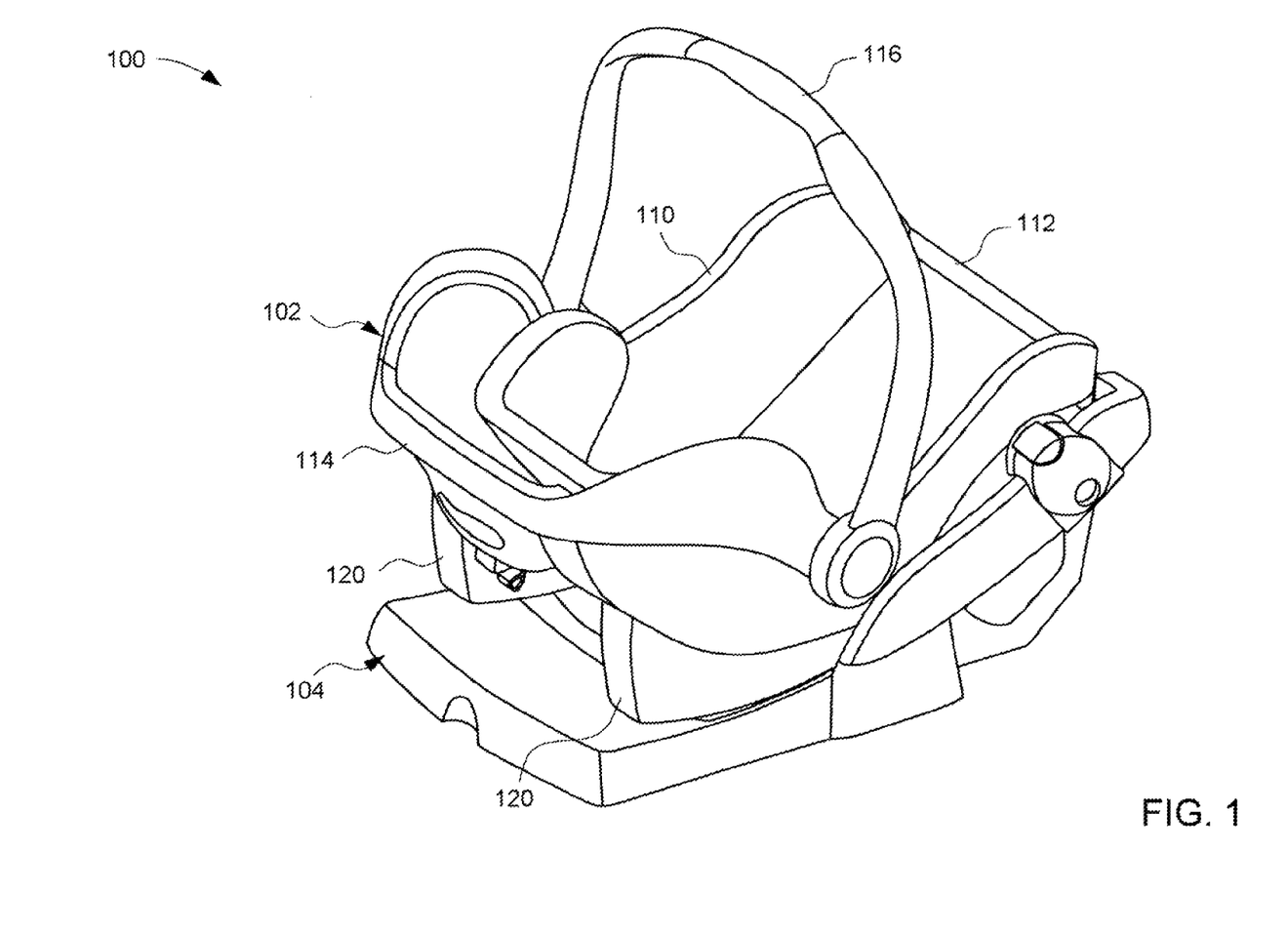
FIG. 1 is a perspective view illustrating an embodiment of a child safety seat assembly.

FIG. 1 is a perspective view illustrating an embodiment of a child safety seat assembly 100. The child safety seat assembly 100 includes a child seat 102 and a base 104. The child seat 102 can include a seat shell 110 having a seat portion 112 and a seatback 114. The seat shell 110, including the seat portion 112 and the seatback 114, can be formed in a single body by plastic molding. A handle 116 can be pivotally connected with two sides of the seat shell 110 to facilitate its carrying. In use, the child seat 102 can be either removed from the base 104, or attached herewith as shown in FIG. 1. After it is removed from the base 104, the child seat 102 can also be desirably mounted with a stroller apparatus. These different configurations of use can be secured via an attachment mechanism that can be adapted operable to fasten the child seat 102 with either of the base 104 and a stroller apparatus. A first embodiment of this attachment mechanism is described hereafter with reference to FIGS. 2-9.

Figure 2:
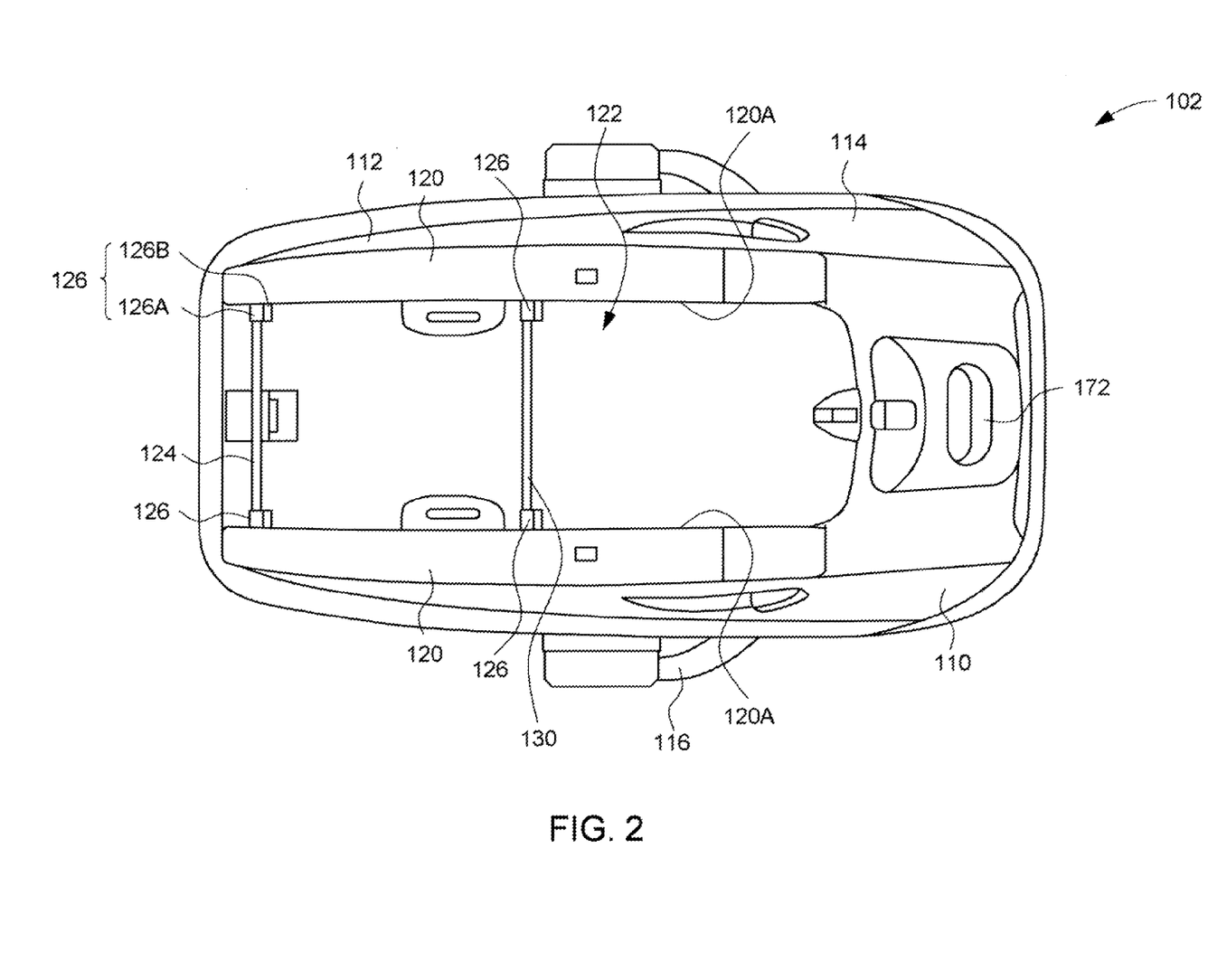
FIG. 2 is a bottom view of the child seat shown in FIG. 1.

FIG. 2 is a bottom view of the child seat 102. A bottom of the child seat 102 can include two protruding rails 120, and a central recessed region 122 laterally delimited between the two rails 120. The rails 120 can be formed at the underside of the seat portion 112, and extend to the rear of the seatback 114. A first transverse shaft 124 can be pivotally mounted between the rails 120 across the recessed region 122 at a first position adjacent to a front of the child seat 102. Two latches 126 can be respectively provided at two opposite end portions of the first transverse shaft 124, adjacent to the opposite inner sidewalls 120A of the rails 120. Each of the latches 126 can be formed as a sleeve 126A that can be affixed around the transverse shaft 124 and is provided with a radial engagement extension 126B oriented upward. A second transverse shaft 130 can be pivotally mounted between the rails 120 across the recessed region 122 at a spaced-apart second position behind the first transverse shaft 124. The second transverse shaft 130 is parallel to the first transverse shaft 124, and can have two opposite end portions mounted with latch elements 126 similar to those provided on the first transverse shaft 124. While the latches 126 have been described as parts assembled on the transverse shafts 124 and 130, alternate embodiments can also have the latches respectively formed integral with the first and second transverse shafts 124 and 130. The latches 126 exposed downward in the recessed region 122 can thereby form four attachment points disposed in two symmetrical pairs adjacent to the inner sidewalls 120A of the left and right side rails 120.

Figure 3:
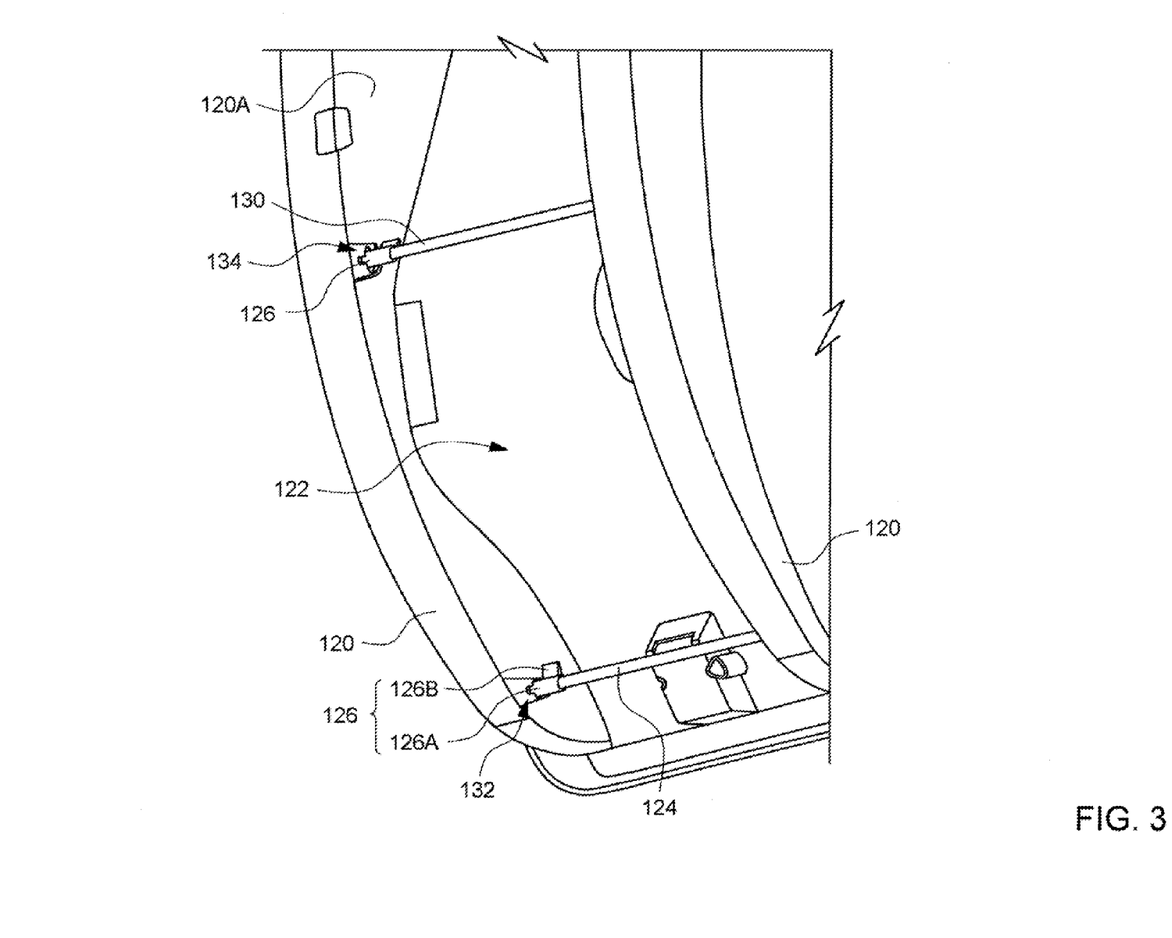
FIG. 3 is a schematic view illustrating how first and second transverse shafts are assembled with the rails in the child seat.

FIG. 3 is a schematic view illustrating how the first and second transverse shafts 124 and 130 are assembled with the rails 120. Each of the rails 120 can have a hollow interior, and include first and second openings 132 and 134 through which the end portions of the first and second transverse shafts 124 and 130 can be pivotally mounted. The second opening 134 may have an oblong shape that permits relative back and forth floating movements of the second transverse shaft 130, which can accommodate manufacturing tolerances and facilitate the movement and placement of the second transverse shaft 130 when the child seat 102 is installed on the base 104.

Figure 4:
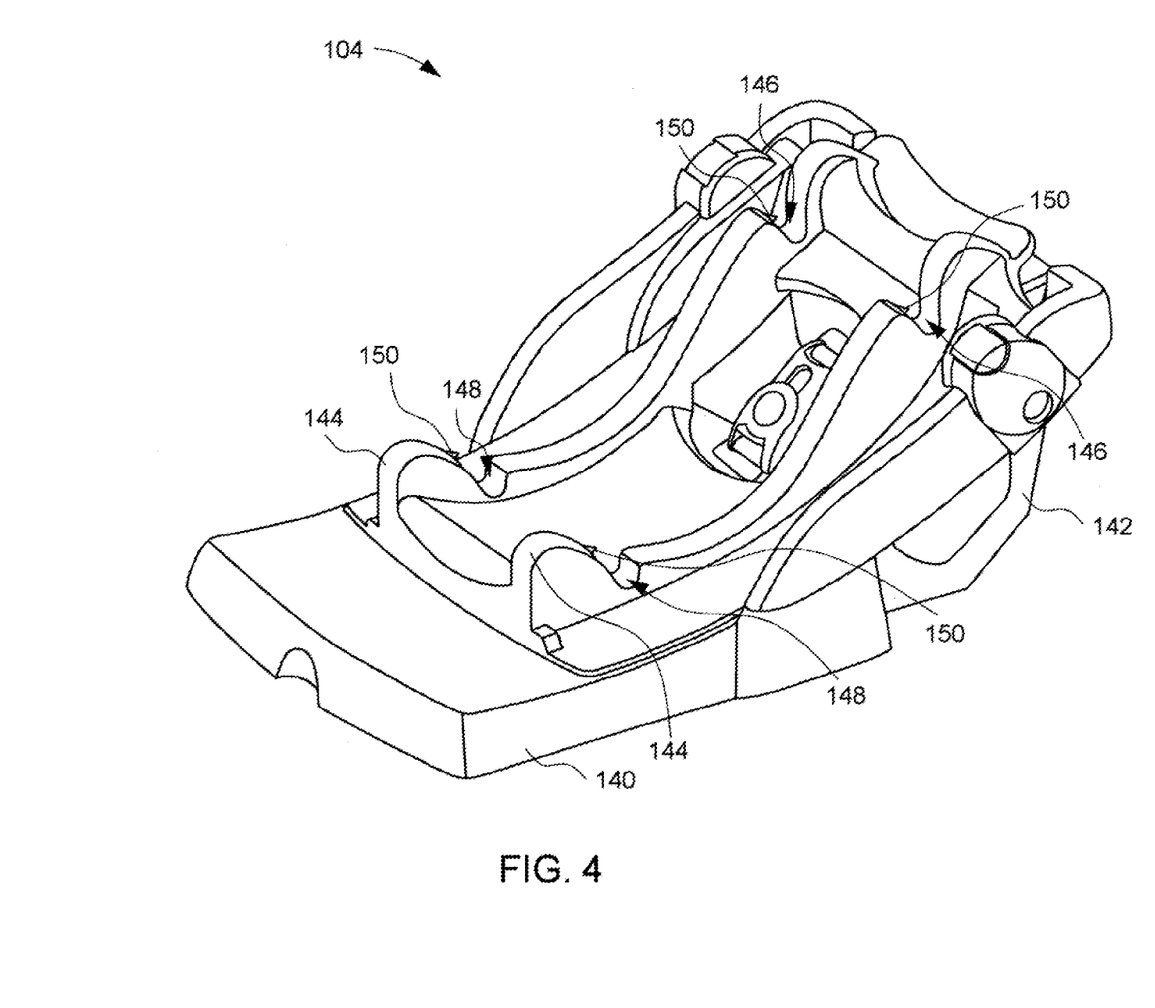
FIG. 4 is a schematic view of the base shown in FIG. 1.

FIG. 4 is a schematic view of the base 104. The base 104 can include a first portion 140 having an enlarged bottom to provide stable support, and a second portion 142 rising from an upper side of the first portion 140 at an inclined angle. An upper side of the base 104 can include a support platform comprised of two protruding guide rails 144 that extend parallel in an axial direction of the base 104 and are adapted to receive the placement of the child seat 102. The guide rails 144 are symmetric in construction, including first grooves 146, and second grooves 148 axially spaced apart from the first grooves 146. The first and second grooves 146 and 148 can be formed as recesses in the upper surfaces of the guide rails 144, and are sized to receive and hold the end portions of the transverse shafts 124 and 130 provided with the latches 126. Moreover, each of the first and second grooves 146 and 148 can include catches 150 with which the latches 126 can engage to lock the child seat 102 with the base 104. In one embodiment, the catches 150 may be formed at a same side in each of the grooves 146 and 148, for example on the left side surface as shown in FIG. 4.

Figure 5:
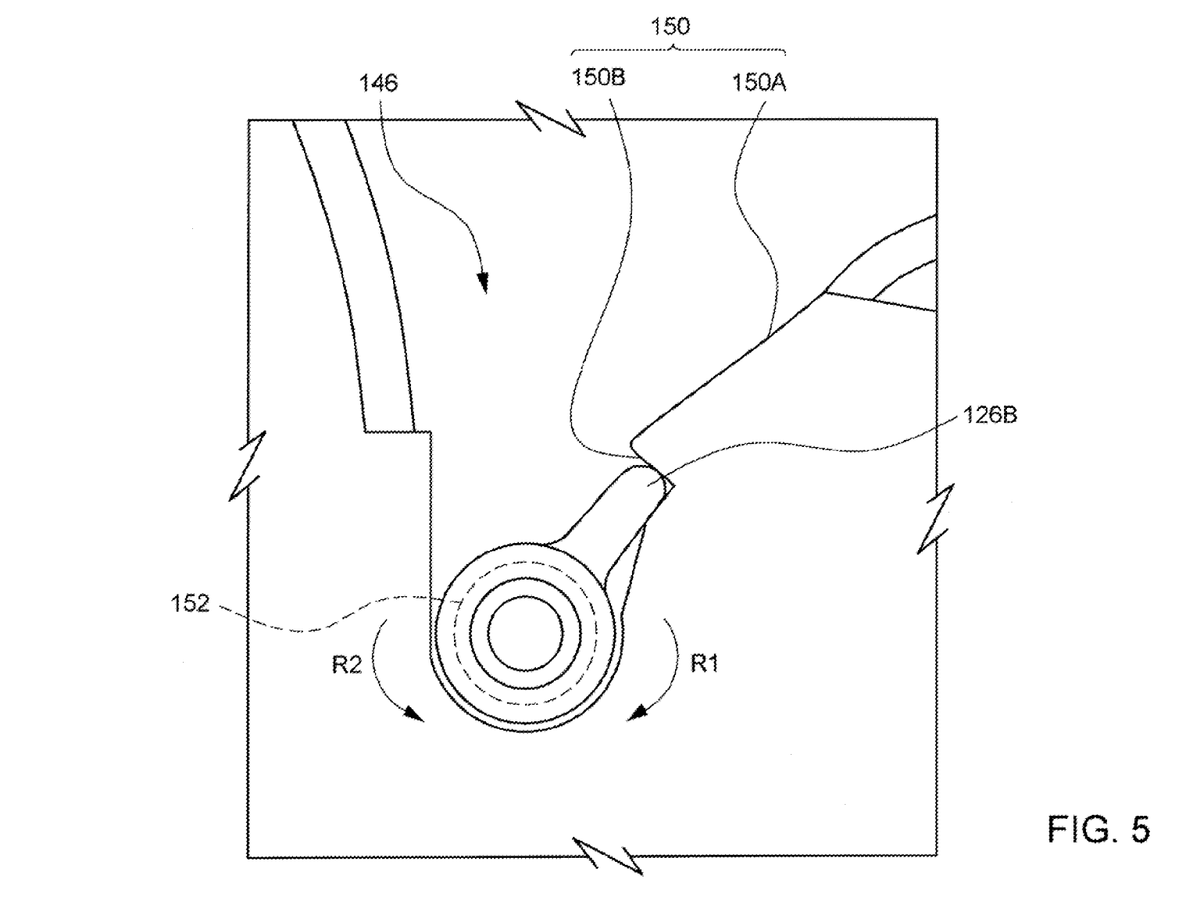
FIG. 5 is an enlarged view illustrating how a first latch of the child seat can engage with a catch in a first groove of the base.
Figure 6:
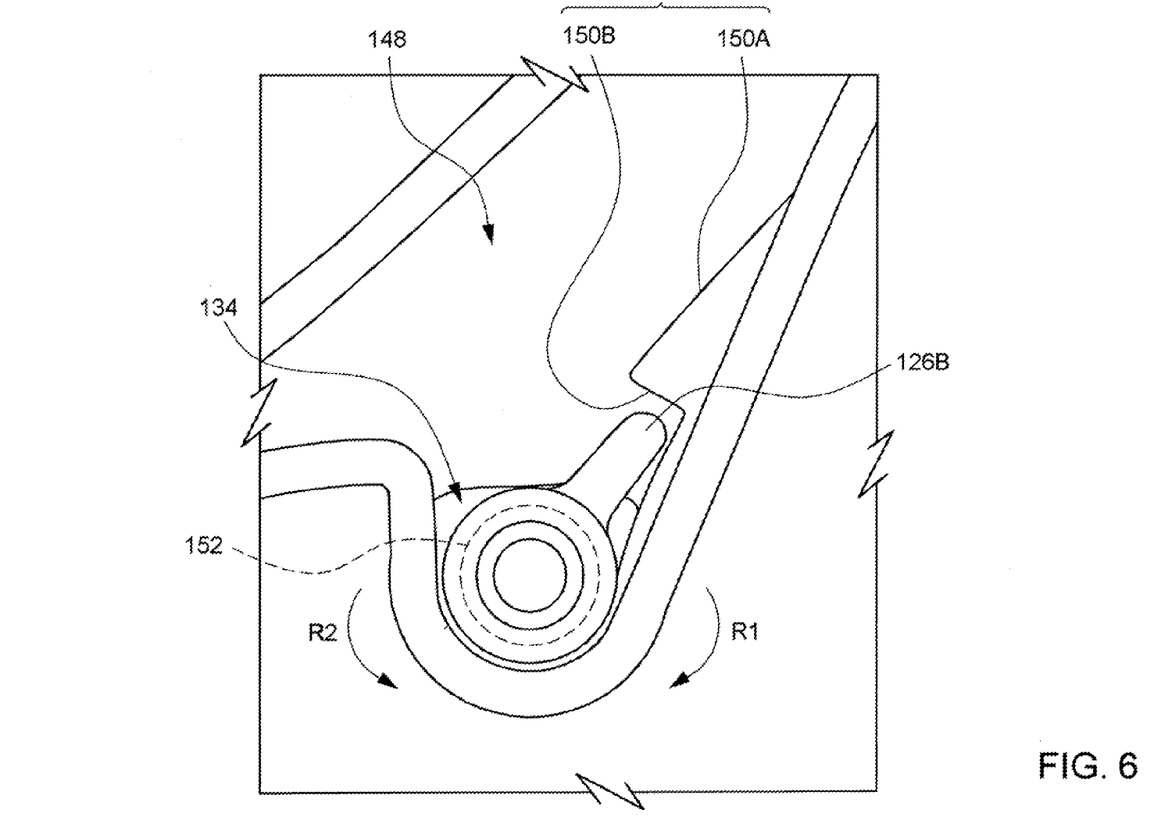
FIG. 6 is an enlarged view illustrating how a second latch of the child seat can engage with a catch in a second groove of the base.

FIGS. 5 and 6 are enlarged views illustrating how the latches 126 can respectively engage with the catches 150 in the first and second grooves 146 and 148. Each of the catches 150 can have a hook shape having an upper angled surface 150A and a lower surface 150B. When the child seat 102 is disposed on the base 104, the angled surface 150A can respectively push away the engagement extension 126B to rotate the transverse shaft 124 so that each of the latches 126 can be received in the associated first and second grooves 146 and 148. While the transverse shaft 124 is held in the first grooves 146, the preset manufacturing/assembly tolerance may result in difficulties of engagement of the second transverse shaft 130 in the second grooves 148. Thanks to the oblong shape of the second openings 134, the second transverse shaft 130 is allowed to self-adjust for adequate placement of the associated latches 126 in the second grooves 148. Once each latch 126 is held in the associated groove, forward and backward movements as well as lateral displacements of the child seat 102 relative to the base 104 can be blocked. A torsion spring 152 mounted with the latch 126 (better shown in FIG. 7) can then bias the latch 126 to rotate about the transverse axis defined by the transverse shaft 130 in a first direction R1 to place the engagement extension 126B in locking engagement against the lower surface 150B of the catch 150, whereby upward removal of the child seat 102 is also blocked. The child seat 102 can be thereby locked in position with the base 104. To unlock the child seat 102, the latches 126 can be rotated in an opposite second direction R2 to disengage the engagement extensions 126B from the lower surface 150B of the catches 150. Being unlocked, the child seat 102 then can be pulled upward and separated from the base 104. For unlocking the latches 126, the child seat 102 can be provided with a release mechanism operable to drive rotation of the latches 126 in the direction R2 for disengagement from the catches 150. One embodiment of this release mechanism is described hereafter with reference to FIGS. 7 and 8.

Figure 7:
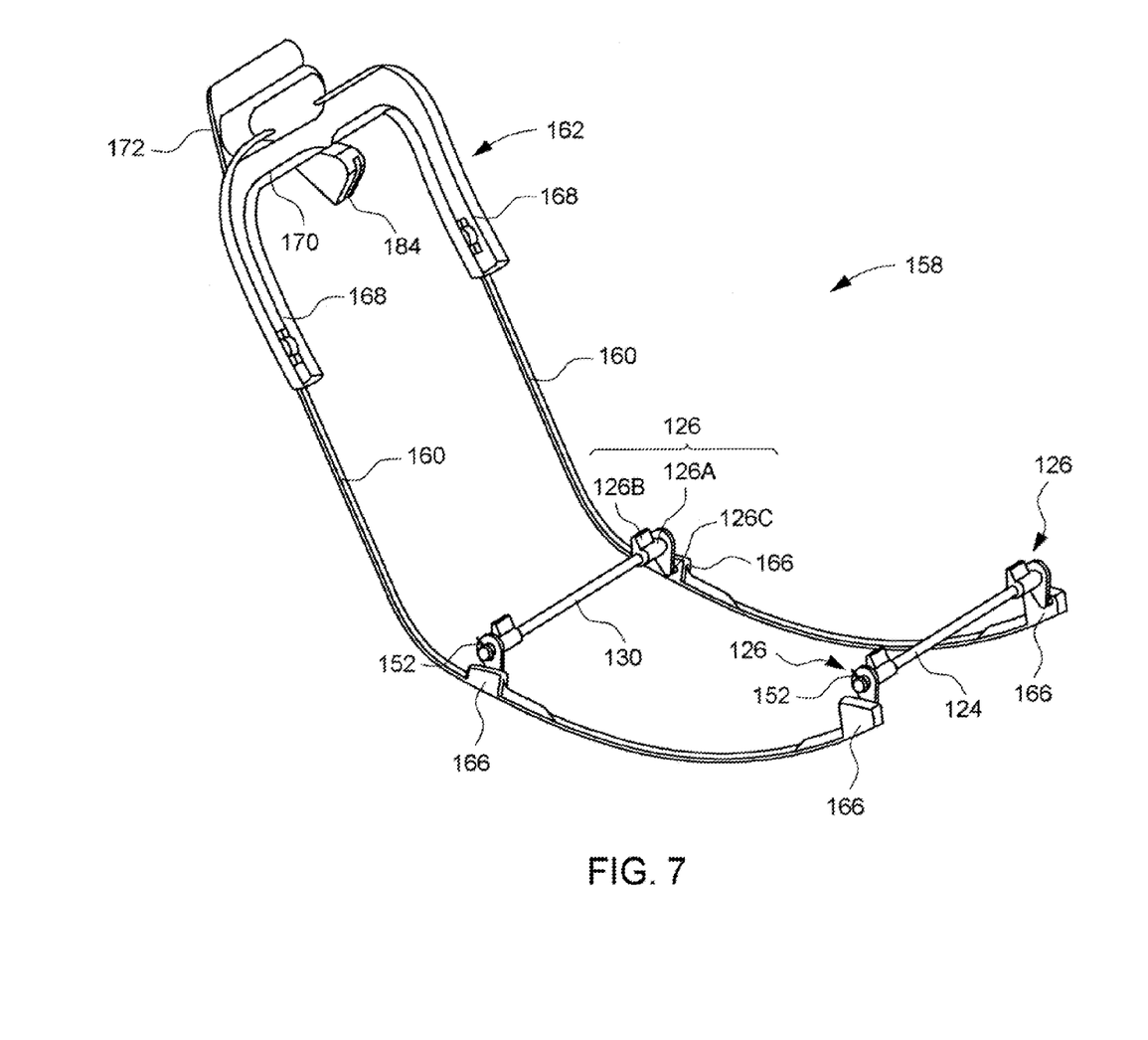
FIG. 7 is a schematic view illustrating one embodiment of a release mechanism operable to unlock the first and second latches shown in FIGS. 5 and 6.
Figure 8:
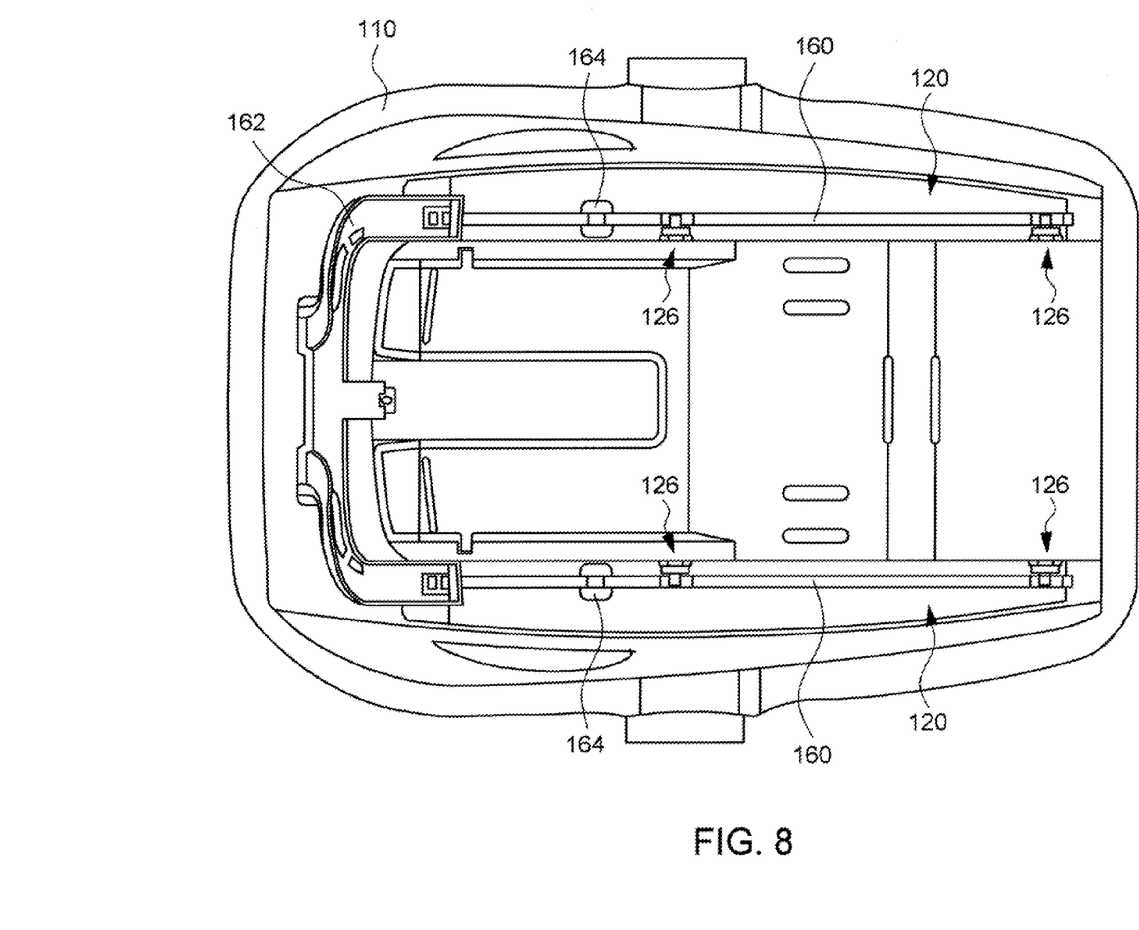
FIG. 8 is a top view illustrating the release mechanism shown in FIG. 7 assembled in the child seat.

FIG. 7 is a schematic view illustrating one embodiment of a release mechanism 158 operable to unlock the latches 126, and FIG. 8 is a top view illustrating the assembly of the release mechanism 158 in the child seat 102. The release mechanism 158 can include two drive elements 160 coupled with the release handle 162. The drive elements 160 can be movably mounted in the interior of the rails 120, and are respectively connected with the latches 126. In one embodiment, the two drive elements 160 can be formed as elongated strips made of plastic, and have bent shapes that generally conform with the profile of the rails 120 extending from the front of the child seat 102 to a rear of the seatback 114. Guiding structures 164 can be provided in the rails 120 to guide movements of the drive elements 160 between a normal position and a released position along a lengthwise axis of the child seat 102.

As better shown in FIG. 7, each of the latches 126 can include a lateral protrusion 126C projecting in a transverse direction from the engagement extension 126B. The drive elements 160 can include a plurality of protruding fingers 166 respectively connected with the lateral protrusions 126C. The fingers 166 can include recesses into which the lateral protrusions 126C can be movably engaged, so that a sliding movement of the drive elements 160 can drive rotation of the latches 126.

The release handle 162 is mounted to move relative to the seat shell 110 generally along the inclination axis of the seatback 114. As shown, the release handle 162 can have a generally U-shape including two side segments 168 respectively connected with end portions of the two drive elements 160, and a transverse segment 170 connected between the two side segments 168. The transverse segment 170 can include a grip 172 that is mounted through an opening 174 (better shown in FIG. 9) formed at the rear of the seatback 114 for facilitating operation of the release handle 162. When the release handle 162 is pulled upward, the drive elements 160 are moved to the released position to drive the latches 126 in rotation in the direction R2 (as shown in FIGS. 5 and 6) to disengage the engagement extensions 126B from the catches 150. The unlocked child seat 102 then can be removed from the base 104.

Figure 9:
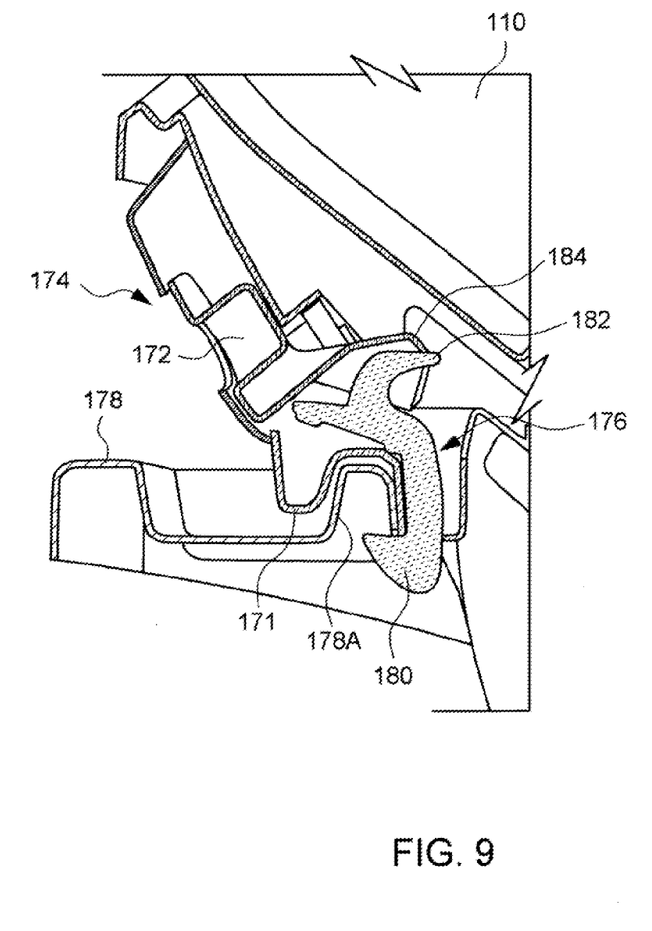
FIG. 9 is a partial cross-sectional view illustrating the connection of the release handle with an additional latch operable to attach with a tray of a stroller.

In conjunction with FIG. 7, FIG. 9 is a partial cross-sectional view illustrating the connection of the release handle 162 with an additional latch 176 operable to attach with a corresponding structure of a stroller, such as a tray 178. As shown, the latch 176 may be pivotally connected with the seat shell 110 at a rear of the seatback 114, and include a hook 180 and an extension 182 projecting at opposite sides relative to the pivot axis of the latch 176. The release handle 162 can include an arm 184 adjacent to the grip 172 and extending inward to couple with the extension 182 of the latch 176 such that the user can operate the grip 172 to release the additional latch 176 as well. In addition, the child seat 102 can also include a rotation blocking portion 171 projecting downward at the rear of the seatback 114. The rotation blocking portion 171 can lie in front of the hook 180 so as to define a gap between the rotation blocking portion 171 and the hook 180. When the child seat 102 is installed on the stroller, a protruding portion of the tray 178 can be lodged in the gap between the latch 176 and the rotation blocking portion 171, and the rotation blocking portion 171 can abut against an inner surface 178A of the tray 178 at a position opposite to the latch 176. Moreover, the hook 180 of the latch 176 can engage with an underside of the tray 178 to attach the rear of the child seat 102 with the stroller. A biasing spring (not shown) may be used to maintain the latch 176 in this locked state. In this manner, the rear of the child seat 102 can be securely kept in place, and the rotation blocking portion 171 can prevent the child seat 102 from undesirable flipping about the region where the tray 178 is engaged with the hook 180.

When the release handle 162 is pulled upward (i.e., in the same way as for unlocking the latches 126 described previously), the arm 184 can pull on the extension 182 to drive rotation of the latch 176 and cause the hook 180 to disengage from the tray 178. The child seat 102 then can be removed from the stroller.

With the foregoing attachment structure, the child seat 102 includes five latches, four latches 126 provided symmetrically at left and right sides to securely attach the child seat 102 with the base 104, and one latch 176 to attach the rear of the child seat 102 with a stroller. To remove the child seat 102 either from the base 104 or the stroller, the same release handle 162 can be operated to conveniently drive all of the latches 126 and 176 in a concurrent manner.

Figure 10:
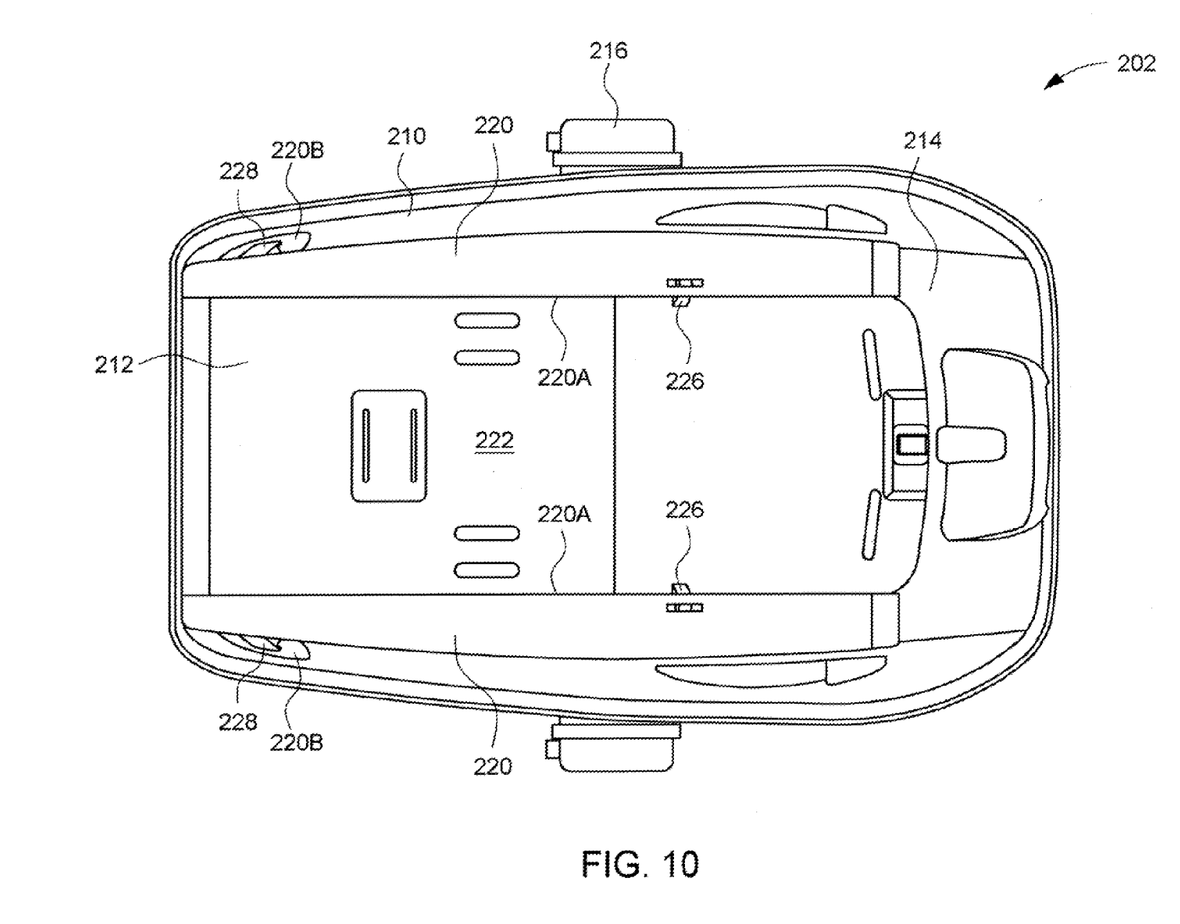
FIG. 10 is a bottom view illustrating another child seat provided with a variant attachment construction.

FIG. 10 is a bottom view illustrating another child seat 202 provided with a variant attachment construction. Likewise, the child seat 202 can include a seat shell 210 having a seat portion 212 and a seatback 214. A handle 216 can be pivotally connected with two sides of the seat shell 210 to facilitate its carrying. A bottom of the child seat 202 can include two protruding rails 220, and a recessed region 222 delimited between the two rails 220. The rails 220 can be formed at the underside of the seat portion 212, and extend to the rear of the seatback 214. Each of the rails 220 can be mounted with two latches, one latch 226 assembled through an opening at an inner sidewall 220A of the rail 220 (i.e., adjacent to the recessed region 222), and one latch 228 assembled through an opening at an opposite outer sidewall 220B of the rail 220 and spaced apart from the latch 226 along a lengthwise axis of the rail 220. The latches 226 and 228, which are constructed symmetric with the two rails 220, can be operable to rotate in opposite directions when the attachment structure is switched from the locked to unlocked state, or reversely. The pivot axes about which the latches 226 and 228 rotate can extend generally along the lengthwise axis of the child seat 202.

Figure 11:
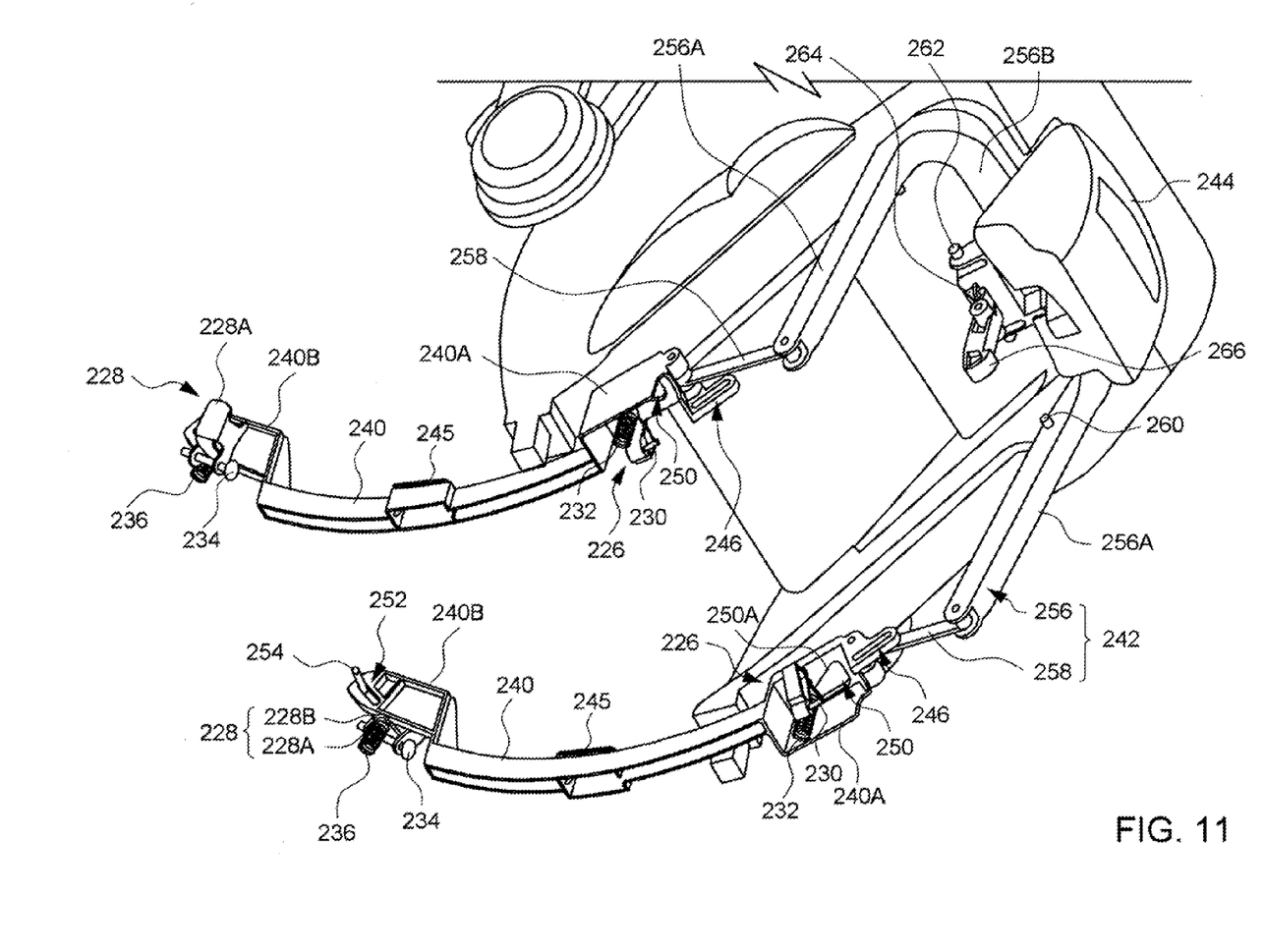
FIG. 11 is a schematic view illustrating the assembly of a plurality of latches operable to attach the child seat shown in FIG. 10 with a base.
Figure 12:
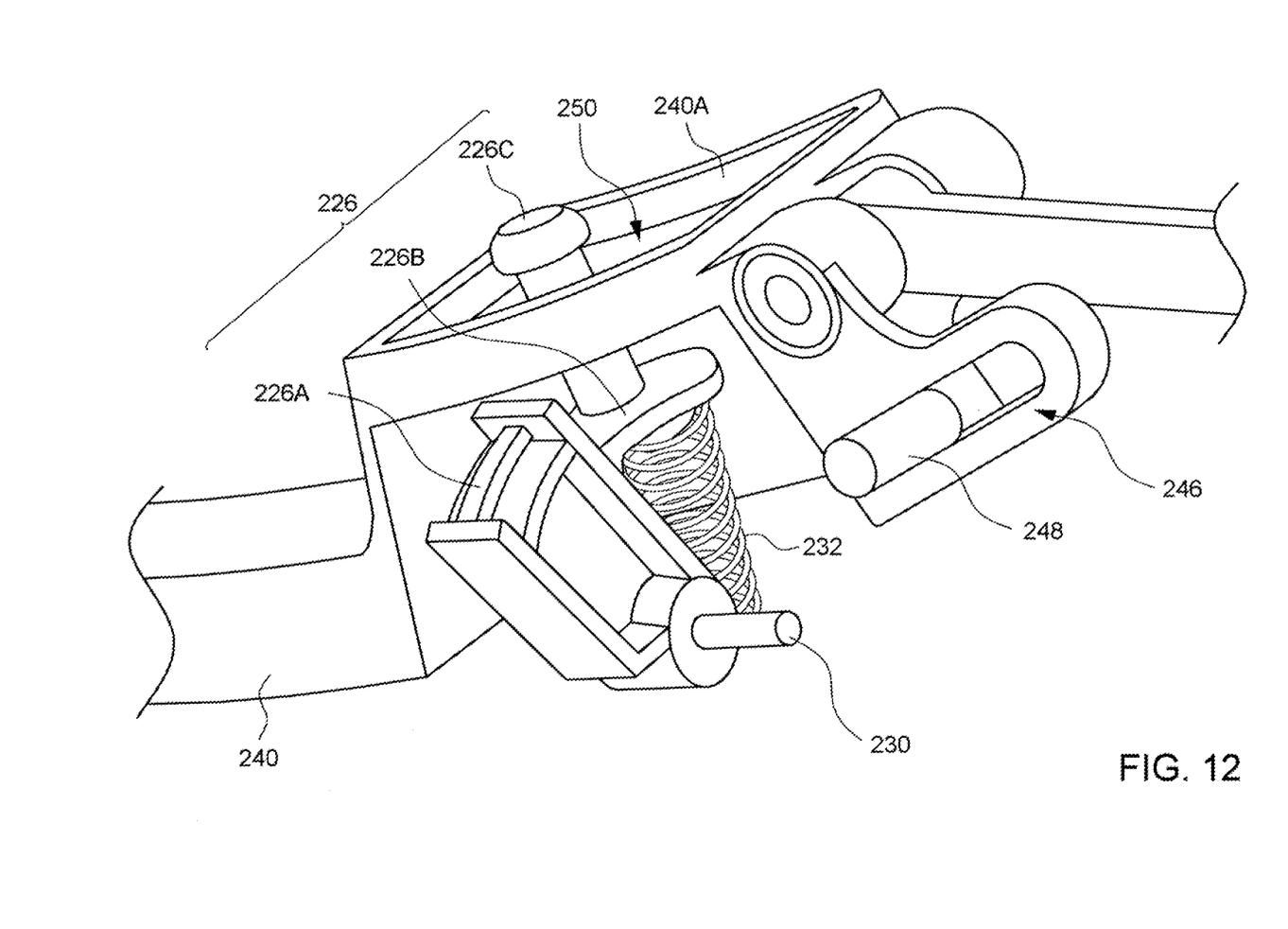
FIG. 12 is an enlarged view of a portion of FIG. 11.

In conjunction with FIG. 10, FIG. 11 is a schematic view illustrating the assembly of the latches 226 and 228, and FIG. 12 is an enlarged view of a portion of FIG. 11. For clarity, certain portions of the seat shell 210 are omitted in these figures to better show the construction of the attachment structure. As shown in FIGS. 11 and 12, each of the latches 226 can be placed at a rearward position (e.g., closer to the release handle 244), and can be pivotally connected with the seat shell 210 via a fixed pivot link 230 (such as a pin or rivet) that define a pivot axis oriented in a lengthwise direction of the seat shell 210 (i.e., from the rear to the front). The latch 226 can be formed in an integral body including a radial engagement extension 226A, a lever 226B projecting in a transverse direction from an inner side of the engagement extension 226A and located at a position upwardly offset from the pivot axis of the pivot link 230, and a stud 226C projecting upward from the lever 226B. A spring 232 can be interposed between a lower side of the lever 226B and an inner bottom surface of the seat shell 210 (not shown).

As shown in FIG. 11, each of the latches 228 can be placed at a forward position (e.g., farther from the release handle 244) in front of the latch 226, and can be pivotally connected with the seat shell 210 via a fixed pivot link 234 (such as a pin or rivet). The latch 228 can be formed in an integral body including a radial engagement extension 228A, and a lever 228B projecting transversal from an inner side of the engagement extension 228A and located at a position upwardly offset from the pivot axis of the pivot link 234. A spring 236 can be interposed between a lower side of the lever 228B and an inner bottom surface of the seat shell 210 (not shown).

Referring again to FIGS. 11 and 12, the child seat 202 also includes a release mechanism that is coupled with the latches 226 and 228. The release mechanism can include two drive elements 240, a bar linkage 242 and a release handle 244. Each of the drive elements 240 can be formed as an elongated part, and is assembled in each of the rails 220 for lengthwise movements along the rails 220. Axial springs 245 can be provided to bias the drive elements 240 forward to recover an initial normal position. Each of the drive elements 240 can include a rear portion 240A and a front portion 240B respectively adapted to interact with the latches 226 and 228 for actuating locking and unlocking operations.

As shown in FIG. 12, The rear portion 240A can have a guide slot 246 through which a fixed anchor 248 (pin or rivet) can be passed to guide lengthwise displacements of the drive element 240. The rear portion 240A can also include a surface that extends above the lever 226B and is provided with a slot 250 into which the stud 226C of the latch 226 is movably engaged. The slot 250 can have a tapered shape with a driving edge 250A that extends gradually farther from the pivot axis of the pivot link 230 toward the rear of the drive element 240 (toward the release handle 244). The biasing action of the spring 232 can keep the stud 226C constantly in contact with the driving edge 250A of the slot 250.

The front portion 240B can be disposed to lie above the lever 228B, and include an angled guide slot 252 through which a fixed anchor 254 (for example rivet or pin) can be passed at a position proximate to the latch 228. The biasing action of the spring 236 can keep an upper side of the lever 228B constantly in contact with the front portion 240B of the drive element 240. The movable engagement of the fixed anchor 254 through the guide slot 252 can guide lengthwise displacement as well as downward and upward deflections of the front portion 240B relative to the seat shell 210 as the drive element 240 moves back and forth along a lengthwise axis.

Referring to FIG. 11, the bar linkage 242 can include a generally U-shaped linkage 256 and two links 258. The linkage 256 can be formed as an integral body having two side segments 256A and a transverse segment 256B. The linkage 256 can be pivotally connected with the seat shell 210 via pivot pins 260 provided on the side segments 258A. The two side segments 256A can be respectively connected with the two drive elements 240 via the two links 258, each of which has a first end pivotally connected with the rear portion 240A of one associated drive element 240 and a second end pivotally connected with one side segment 256A of the linkage 256.

The release handle 244 can be assembled through the rear of the seatback 214, and is assembled adjacent to the transverse segment 256B of the linkage 256. Pins 262 may be provided to pivotally connect the release handle 244 with the seat shell 210. Moreover, the release handle 244 can also include an arm 264 that is coupled with an additional latch 266 configured to attach the rear of the child seat 202 with a stroller, whose mechanism is substantially the same as that of the previous embodiment.

Exemplary operation of the aforementioned attachment structure is described hereafter with reference to FIGS. 10 through 13. When the child seat 202 is installed on a base 304, the axial springs 245 can bias the drive elements 240 to return to the normal position. As a result, the interaction between the lever 226B and the spring 232 can drive the associated latch 226 to rotate in a direction for bringing the engagement extension 226A to a position extending outward from the inner sidewall 220A of the rail 220. Meanwhile, the movable engagement of the fixed anchor 254 through the guide slot 252 at the front portion 240B of each drive element 240 can cause the drive element 240 to deflect upward, which allows the associated latch 228 biased by the spring 236 to rotate in a direction for bringing the engagement extension 228A to a position extending outward from the outer sidewall 220B of the corresponding rail 220. The latches 226 and 228 can be thereby in locking engagement against associated catch structures 346 and 348 provided on the base 304 to block upward removal of the child seat 202.

Figure 13:
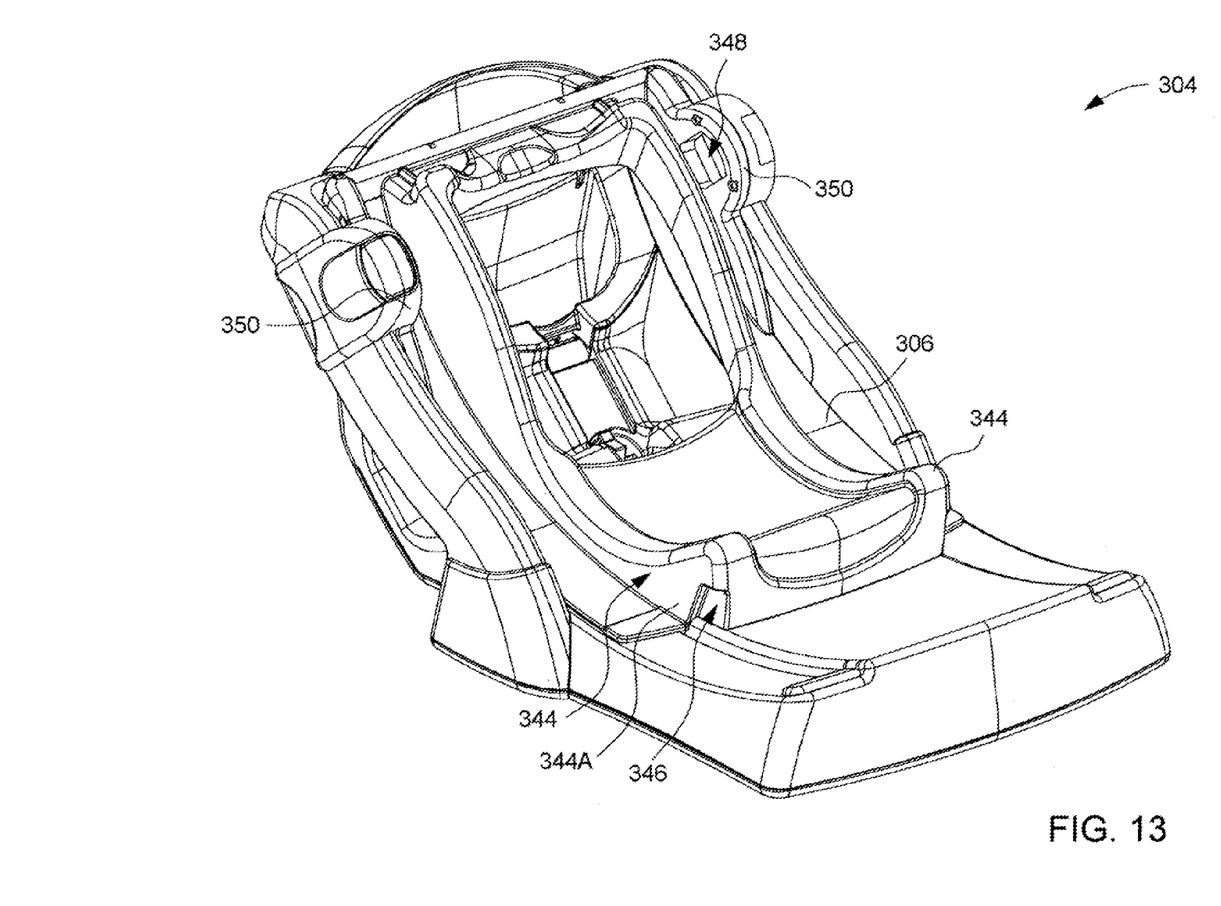
FIG. 13 is a schematic view illustrating a base adapted to assemble with the child seat shown in FIG. 10.

In conjunction with FIG. 10, FIG. 13 is a schematic view illustrating a base 304 provided with catch structures for attaching with the child seat 202. The base 304 may include a support platform 306 comprised of two guide rails 344 that extend parallel in an axial direction of the base 304 and are adapted to receive the placement of the child seat 202. The support platform 306 may include a plurality of catch structures 346 and 348 disposed symmetric in association with the latches 226 and 228 described above. For example, the catch structures 346 may be recesses symmetrically formed on the outer sidewalls 344A of the rails 344. The catches structures 348 may be openings symmetrically provided on an inner side of two sockets 350 projecting upward from the support platform 306 at outer sides of the rails 344. When the child seat 202 is installed on the base 304, the inner sidewalls 220A of the rails 220 on the child seat 202 are respectively placed adjacent to the outer sidewalls 344A of the rails 344 on the base 304, whereas the outer sidewalls 220B of the rails 220 are respectively adjacent to the inner sides of the sockets 350. The latches 226 and 228 can respectively engage with the catch structures 346 and 348 to lock the child seat 202 with the base 304.

To unlock the child seat 202, the release handle 244 can be pushed to rotate upward, which pushes the linkage 256 in rotation in the same direction. The rotation of the linkage 256 can pull the two drive elements 240 rearward via the links 258, which also compress the axial springs 245. As each of the drive elements 240 move rearward, the interaction between the stud 226C of the latch 226 and the driving edge 250A at the rear portion 240A of the drive element 240 and can drive each latch 226 to rotate in a direction that retracts the engagement extension 226A inward and compresses the spring 232. In the meantime, the movable engagement of the anchor 254 through the guide slot 252 at the front portion 240B also causes the front portion 240B of the drive element 240 to deflect downward against the lever 228B, which in turn compresses the associated spring 236 and causes each latch 228 to rotate in a direction that retracts the engagement extension 228A inward. All of the latches 226 and 228 can thereby unlock in a concurrent manner, allowing upward removal of the child seat 202. Once the release handle 244 is released, the drive elements 240 can be biased to move forward to the normal position by the axial springs 245, and the elastic force applied by the springs 232 and 236 can restore the initial locking positions of the latches 226 and 228 respectively.

Similar to the previously described embodiment, the operation of the release handle 244 can also drive the latch 266 in rotation for disengaging the latch 266 from a tray of a stroller.

At least one advantage of the structures described herein is the ability to securely attach the child seat with the base via four latches distributed symmetrically along two rails that extend lengthwise at the underside of the child seat. All of the four latches can be controllably driven to unlock concurrently via a release mechanism integrated in the child seat. In addition, the child seat also includes a latch that can attach the rear of the child seat with a stroller, and can be driven to unlock via the same release mechanism.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child seat comprising:
 a seat shell having two protruding rails extending at an underside of the seat shell;
 at least four latches operable to lock and unlock the child seat with respect to a base, the four latches including a first and a second latch assembled adjacent to one of the two rails, and a third and a fourth latch assembled adjacent to the other one of the two rails, and the first and third latches being respectively affixed with a transverse shaft that is pivotally assembled with the seat shell, the transverse shaft defining a pivot axis of the first and third latches; and
 a release mechanism including two drive elements operable to drive the four latches to unlock from the base, the drive elements including a first and a second drive element of elongated shapes respectively arranged in the two rails, the first drive element being respectively connected with the first and second latches, and the second drive element being respectively connected with the third and fourth latches, wherein a sliding displacement of the first and second drive elements for unlocking the four latches causes the first and third latches to rotate along with the transverse shaft about the pivot axis relative to the seat shell,
 wherein a radial engagement extension of each of the first and third latches upwardly terminates into a distal end which engages with a base above the pivot axis for locking the child seat with the base.

2. The child seat according to claim 1, wherein the four latches are pivotally connected with the seat shell, and the first and second drive elements are operable to slide lengthwise in the rails to drive rotation of the four latches.

3. The child seat according to claim 1, wherein the second and fourth latches are operable to rotate about a second pivot axis that is spaced apart from the pivot axis of the first and third latches, the two pivot axes extending transversal relative to the seat shell.

4. The child seat according to claim 1, wherein the second and fourth latches are affixed with a second transverse shaft spaced apart from and substantially parallel to the transverse shaft connecting with the first and third latches, the two transverse shafts being pivotally connected with the seat shell.

5. The child seat according to claim 1, wherein at least a pair of oblong openings are formed respectively on two lateral sides of the seat shell, and the first and third latches are disposed through the oblong openings so that a position of the first and third latches is adjustable along a lengthwise direction of the seat shell.

6. The child seat according to claim 1, wherein the two rails laterally delimit a central recessed region, and each of the first and third latches comprises:
 the radial engagement extension located in the central recessed region; and a lateral protrusion connected with one of the two drive elements.

7. The child seat according to claim 6, wherein the first and third latches are respectively mounted with torsion springs operable to bias the first and third latches toward a locking state.

8. The child seat according to claim 1, wherein the seat shell has a seatback, and the two drive elements have bent shapes that generally conform with a profile of the rails and extend from a region near a front of the seat shell to a rear region of the seat shell corresponding to the seatback.

9. The child seat according to claim 8, wherein the release mechanism further includes a release handle that is connected with the two drive elements and is operable to move relative to the seat shell.

10. The child seat according to claim 1, further including an additional latch operable to attach a rear of the child seat with a stroller structure, wherein the release mechanism is further operable to drive the additional latch to unlock from the stroller structure.

11. The child seat according to claim 10, further including a rotation blocking portion located in front of the additional latch, wherein when the additional latch is locked with the stroller structure, the rotation blocking portion abuts against a portion of the stroller structure at a position opposite to the additional latch to block rotation of the child seat.

12. The child seat according to claim 1, wherein the four latches are respectively spring-biased for engaging with the base.

13. The child seat according to claim 6, wherein the lateral protrusion of each of the first and third latches is located eccentric from the pivot axis.

14. A child seat comprising:
   a seat shell having a seatback and two protruding rails extending at an underside of the seat shell;
   two latches operable to lock and unlock the child seat with respect to a base, wherein the two latches are respectively assembled adjacent to the two rails, and are respectively affixed with a transverse shaft that is pivotally assembled with the seat shell, the transverse shaft defining a pivot axis of the two latches; and
   a release mechanism including two drive elements operable to drive the two latches to unlock from the base, and a release handle affixed with the two drive elements and accessible from a rear surface of the seatback, the drive elements including a first and a second drive element that are respectively in contact connection with the two latches, wherein the release handle is operable to cause a sliding displacement of the first and second drive elements which drive the two latches to rotate along with the transverse shaft about the pivot axis relative to the seat shell, and
   wherein a radial engagement extension of each of the first and third latches upwardly terminates into a distal end which engages with a base above the pivot axis for locking the child seat with the base.

15. The child seat according to claim 14, wherein each of the two latches includes a lateral protrusion that is located eccentric from the pivot axis and is in contact connection with one of the two drive elements.

16. The child seat according to claim 1, wherein the two rails laterally delimit a central recessed region, and each of the two latches includes the radial engagement that extends radially from the pivot axis and is located in the central recessed region.

17. The child seat according to claim 14, wherein the two drive elements extend from a region near a front of the seat shell to a rear region of the seat shell corresponding to the seatback.

18. The child seat according to claim 14, wherein the two latches are respectively spring-biased to a locking state for engaging with a base.

19. The child seat according to claim 14, wherein the two latches are forward latches, and the child seat further including two rearward latches respectively connected with the first and second drive elements behind the forward latches, the forward and rearward latches being operable to lock and unlock the child seat with respect to a base.

* * * * *